H. H. STIMPSON.

3 Sheets—Sheet 1.

Range.

No. 84.

Reissued Aug. 8, 1846.

N. PETERS, Photo-Lithographer, Washington, D. C.

3 Sheets—Sheet 2.

H. H. STIMPSON.

Range.

No. 84.

Reissued Aug. 8, 1846.

Section B.B. Fig: 6.

N. PETERS. Photo-Lithographer. Washington. D. C.

H. H. STIMPSON.
3 Sheets—Sheet 3.
Range.
No. 84.
Reissued Aug. 8, 1846.
Fig. 6.
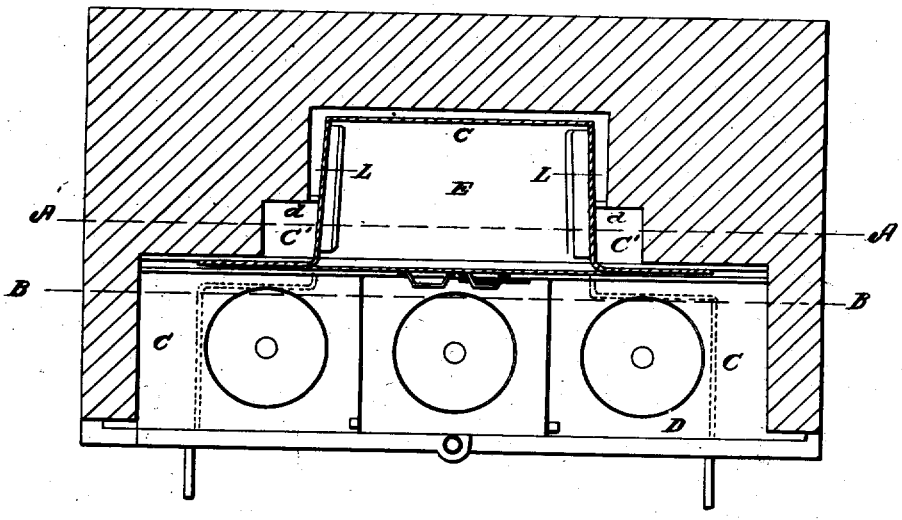
Fig. 3. Section on A.A. Fig. 6.
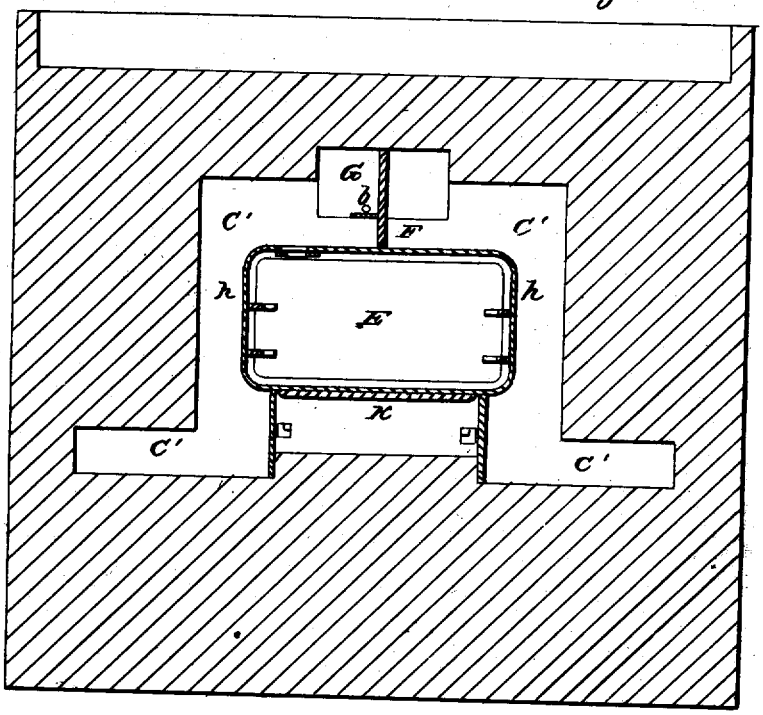
N. PETERS. Photo-Lithographer. Washington. D. C.

UNITED STATES PATENT OFFICE.

H. H. STIMPSON, OF BOSTON, MASSACHUSETTS.

IMPROVEMENT IN COOKING-RANGES.

Specification forming part of Letters Patent No. 3,587, dated May 17, 1844; Reissue No. 84, dated August 8, 1846.

*To all whom it may concern:*

Be it known that I, HERBERT H. STIMPSON, of Boston, in the county of Suffolk and State of Massachusetts, have invented a new and useful Improvement in the Cooking-Range; and I do hereby declare that the following is a full, clear, and exact description of the principle or character which distinguishes my invention from all other things before known, and of the manner of making, constructing, and using the same, reference being had to the accompanying drawings, making a part of this specification, in which—

Figure 4:
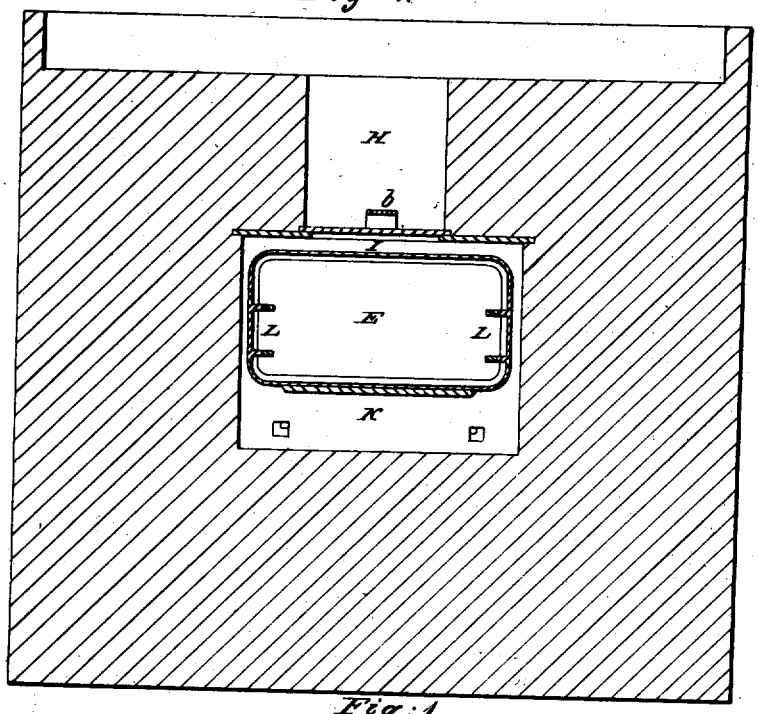
Figure 1:
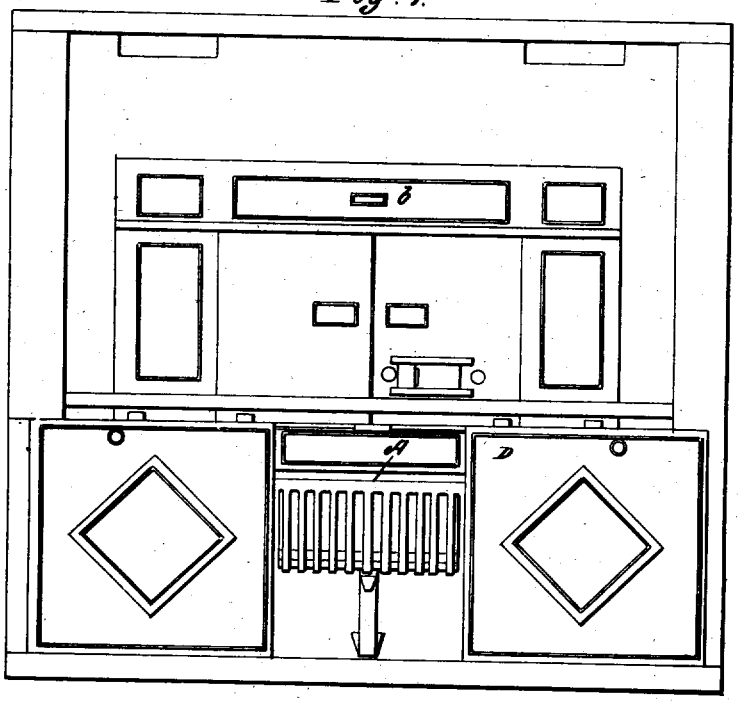
Figure 2:
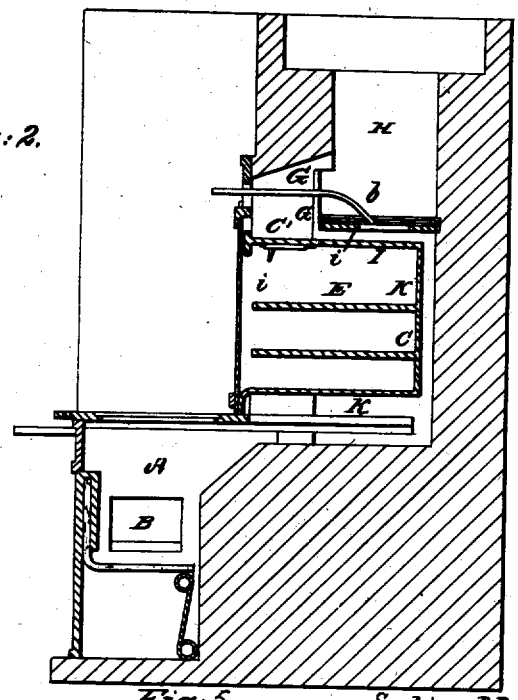
Figure 5:
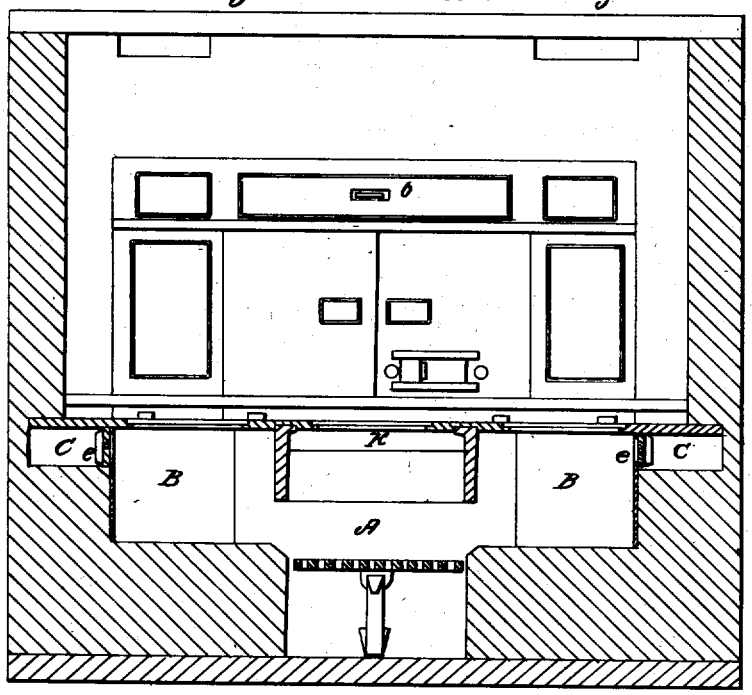

Figure 1 is an elevation of the front of the range; Fig. 2, a transverse central and vertical section; Fig. 3, a vertical longitudinal section taken through the lateral flues and front part of the oven; Fig. 4, another section taken parallel to the latter, but in rear of it and of the lateral flues; Fig. 5, another longitudinal and vertical section taken through the fire-grate and boiling-chambers; and Fig. 6 a horizontal section through the oven and its flues, taken just above the fire-chamber.

The same letters indicate like parts in all the figures.

The nature of my invention consists in heating portions of the oven of a cooking-range by means of the two lateral flues which pass through the boiling-chambers, in combination with the heating of the remaining portions by means of the main flue, these three flues being separate and distinct while they pass around the oven, and only uniting in the chimney after acting on the oven, whereby the heat can be regulated on any part of the oven, the temperature of one part increased or decreased at pleasure by means of the dampers without producing a corresponding change in the other parts.

In the ranges made prior to my invention the oven is heated by the single main flue, which circulates around it in various directions, or by the two lateral or boiler flues, and therefore the heat cannot be regulated in any one part of the oven without producing a material change in the other parts, and therefore baking cannot be conducted with the same degree of nicety as in mine, where any of the three flues may be wholly or partly closed and thus the heat regulated at pleasure.

It will be obvious that the arrangement may be greatly varied without changing the principle of my invention, which, as stated above, consists in heating the oven by means of the three independent flues. The mode in which I have applied this principle is fully represented in the accompanying drawings, in which—

A is the fire-grate, and B the boiling-chambers, of the usual construction, the top plates of the boiling-chambers being provided with boiler-holes. The grate or fire chamber communicates directly with the boiling-chambers on each side, and from each of these chambers there is a horizontal flue, C, governed by a damper, *e*, (in the usual manner,) which communicates with a vertical flue, C′, at each end *h* of the oven E, which is placed back of the fire-grate, so that the heated air and products of combustion pass up this flue and in contact with a portion of the end plate of the oven, and thence over the forward portion of the top to the vertical partition F, and out through a hole, G, in a vertical partition, G′, above the oven, to the chimney-flue H, the partition G′ being a continuation of the vertical partitions *d d*, the same arrangement being observed at each end of the oven. The main flue K passes directly from the back of the fire-grate, under the oven, into a vertical flue, *c*, at the back of the oven, and which extends around the ends thereof, as at L, to the vertical partitions *d d*, that separate this from the lateral flues C′ C′. This main flue leads into the flue-space I over the back part of the top of the oven and communicates with the chimney H through an aperture in a horizontal plate, *i*, governed by a valve, *b*, by which the draft can be regulated in the main flue; but it will be obvious that the valves for regulating the draft in the three flues may be placed differently, as this arrangement is merely pointed out as that mode of applying the principle of my invention which I have adopted and deem the best.

I do not claim as my invention heating the oven of a cooking-range by means of the main flue separately, or by means of the two lateral flues after passing through the boiling-chambers; but What I do claim as my invention, and desire to secure by Letters Patent, is—

Heating portions of the oven of a cooking-range by means of the two lateral flues, substantially as herein described, in combination with the main or direct flue, by which the other portions of the oven are heated, the three flues being separate while acting on the oven, substantially as described, whereby the heating of the several parts of the oven can be regulated by each flue acting independently of the others, as herein described.

H. H. STIMPSON. [L. S.]

Witnesses:

FRED. H. STIMPSON,
JOHN A. MCKOWN,
THOMAS A. DEXTER.